United States Patent [19]
Kaneko et al.

[11] Patent Number: 5,802,020
[45] Date of Patent: Sep. 1, 1998

[54] OPITCAL DISK DEVICE HAVING A PLURALITY OF RECORD AND PLAYBACK UNITS

[75] Inventors: Hisaharu Kaneko, Yokohama; Masatoshi Sato, Machida, both of Japan

[73] Assignee: Nikon Corporation, Tokyo, Japan

[21] Appl. No.: 745,835

[22] Filed: Nov. 8, 1996

[30] Foreign Application Priority Data

Nov. 9, 1995 [JP] Japan ................... 7-290960
Sep. 20, 1996 [JP] Japan ................... 8-249984

[51] Int. Cl.$^6$ ................... G11B 17/22
[52] U.S. Cl. ................... 369/34; 369/33
[58] Field of Search ................... 369/30, 34, 36, 369/37, 38, 178; 395/616, 439

[56] References Cited

U.S. PATENT DOCUMENTS

| | | | |
|---|---|---|---|
| 5,237,547 | 8/1993 | Ohkuma et al. | 369/13 |
| 5,467,326 | 11/1995 | Miyashita et al. | 369/30 |
| 5,495,457 | 2/1996 | Takagi | 369/30 |

FOREIGN PATENT DOCUMENTS

2662293  11/1991  France ................... 369/30
7-55977   3/1995  Japan .

*Primary Examiner*—Tan Dinh

[57] ABSTRACT

An optical disk recording device, an optical disk playback device, and an optical disk system have a large on-line capacity, a high speed data transfer speed, and a smooth data transfer speed. The optical disk recording device includes a plurality of recording units to record on a plurality of optical disks and a control unit that divides the data to be recorded between a plurality of optical disks, sends the divided data to the plurality of recording units, and fixes the amount of data recorded per unit time on each disk. In the optical disk playback device, a plurality of playback units replaces the plurality of recording units. The control unit controls, as substantially fixed, the total playback amount of data per unit time from the plurality of optical disks, and combines data from the plurality of optical disks played back by the playback units. In the optical system, the device accepts a magazine of optical disk cartridges that each house an optical disk. The optical disks are loaded into a plurality of recording or playback units by a conveying unit, with the conveying unit including multiple conveyance devices.

12 Claims, 5 Drawing Sheets

OPITCAL DISK DEVICE HAVING A PLURALITY OF RECORD AND PLAYBACK UNITS

CROSS REFERENCE TO RELATED APPLICATIONS

This application is based upon and claims priority from Japanese Patent Applications Nos. 07-290960 filed Nov. 9, 1995 and 08-249984 filed Sep. 20, 1996, the contents of each being incorporated herein by reference.

BACKGROUND OF THE INVENTION

1. Field of the Invention

This invention relates to optical disk recording devices and optical disk playback devices, which are used as external data devices of computers or image processing devices and the like.

2. Description of the Related Art

In recent years, memory devices which satisfy various requirements including high density, large capacity, high access speed, and also high recording and playback speed have rapidly come into general use. Among these memory devices are optical disks, having the merit of being of large capacity and also removable, which have been receiving attention for their use as computer memory devices. Futhermore, as optical disks are produced at standardized sizes, rapid diffusion throughout the market is expected.

Furthermore, the increase of capacity is remarkable in the case of external memory devices of computers. In optical disk recording and playback devices, without exception, various methods have been proposed of making their data capacity large.

For example, die modified constant angular velocity ("MCAV") method is a technique of increasing the capacity per unit surface, by equalizing the recording density of optical disks. In the MCAV method, an optical disk is caused to rotate at a fixed rpm, and the record and playback frequency is increased, moving towards the outer circumference. The recording density is then about constant for any track. Namely, the length of the recorded marks of any track is about constant, and the number of sectors per track increases as the tracks get closer to the external circumference.

Moreover, one form of the MCAV method is called die zone CAV ("ZCAV") method. In the ZCAV method, the tracks of an optical disk are divided into a plurality of groups of a plurality of tracks per group. These groups are called zones. A plurality of donut-shaped zones exist. In the tracks belonging to each zone, recording and playback are performed at the same clock frequency. Then the more a zone is located towards the exterior (zones with high linear speed), the higher the recording and playback frequency. The recording density of each zone is equalized in this manner.

In a general method of using optical disk memory, such as a stand-alone type, one optical disk drive is connected to a computer or the like host, thus requiring many users to insert one optical disk cartridge. Furthermore, a method of performing disk recording and playback, in cases in which large capacity memory is necessary, such as a so-called juke box type, one to four optical disks are introduced into a cabinet. Furthermore mounting a few to hundreds of optical disks in racks, the necessary optical disk may be automatically inserted into the optical disk drive.

Optical disks have the merits of large capacity and being removable, but a weak point in comparison with hard disks and the like is that their transfer rate is low. Because of this, as a method of increasing the transfer rate, with the object of shortening the erasure time and verify time, direct overwrite methods or one beam verify methods and the like have been developed.

Furthermore, as a method of increasing the transfer rate, there is a method of simultaneously accessing respective optical disks (parallel access method), in which a few or tens of optical disk drives are arrayed in parallel, and optical disks are mounted on respective disk drives. In this case, in order to obtain the necessary transfer rate, the number of optical disk drives can be increased correspondingly, Nevertheless, in the known methods of increasing the parallel transfer rate with a plurality of disk drives in parallel, the management of optical disks in order for one person to insert an optical disk in each drive is complicated, and mistakes were made in inserting disks in drives. Because of this, when performing parallel processing, there was a problem that the order of the data became misaligned and chaotic.

Moreover, in an optical disk drive, the direction of access to an optical disk is normally set as being from the inner circumference to the outer circumference (or from the outer circumference to the inner circumference). Because of this, in the parallel access method also, the result is that the access direction is set in the same direction in all the optical disk drives.

Accordingly, when the MCAV method or ZCAV method is adopted as a method of parallel access to optical disk drives, the data transfer rates differ according to the drive which is accessed, and the data transfer speed becomes slower, as movement towards the inner circumference of the disk occurs. In this case, according to use, the minimum data transfer speed, namely the data transfer rate of the slowest, innermost circumference, becomes the system performance.

Moreover, the present assignee has proposed in Japanese Patent Application Hei 7-55977 an optical disk recording and playback device which can make on-line capacity large, can make Se data transfer speed higher, and can smooth the data transfer speed.

In this proposed optical disk recording and playback device, using optical disks of the MCAV method or ZCAV method, having tracks on both sides of the disk (A side, B side), two optical heads are set up so as to be able to simultaneously access facing the surfaces of both sides, the A side and the B side, of this optical disk. By accessing the B side from the outer circumference with many sectors per one track, in succession in the direction of the inner circumference from the outer circumference, and on the A side by accessing towards the outer circumference in succession from the inner circumference, which has a small number of sectors per track, the data transfer amount per unit time is smoothed. Nevertheless, in such a device, an optical disk drive which has a two optical head set up is necessary.

SUMMARY OF THE INVENTION

Accordingly, it is an object of the present invention to provide, in a system using plural optical disk drives and plural optical disk cartridges design and implementation of an optical disk system which can perform disk management without error.

Furthermore, an object of the present invention is to provide an optical disk recording device, an optical disk playback device, and an optical disk system which, without using special optical disk drives, are able to make the on-line capacity large, can add a higher speed data transfer speed, and can smooth the data transfer speed.

Objects of the present invention are achieved by an optical disk recording device, comprising a plurality of recording units to record data on at least two optical disks, respectively, and a control unit to divide data to be recorded, for use with said optical disks, to send the divided data to the plurality of recording units, and to control a recorded amount of data such that a total amount of recorded data is substantially fixed, the recorded amount of data per unit time onto said optical disks by the plurality of recording units being substantially constant.

Other objects of the present invention are achieved by an optical disk recording device, comprising first and second recording units to record data on first and second optical disks, each disk having tracks of plural sectors with a larger number of sectors per track at the exterior circumference of each optical disk and a smaller number of sectors per track at the interior circumference of each optical disk, and a control unit to divide data to be recorded for use on the first and second optical disks, to send the divided data to the first and second recording units, to cause performance by the first recording unit of recording of data to the first optical disk, in a direction in succession from the exterior circumference towards the interior circumference, and to cause performance by the second recording unit of recording of data to the second optical disk, in succession from the interior circumference towards the exterior circumference.

Still further objects of the present invention are achieved by an optical disk playback device, comprising a plurality of playback units which playback data recorded in at least two optical disks, and a control unit to control, and to keep substantially fixed, total playback amount per unit time of the data from the optical disks, and in addition to combine data from the optical disks played back by the plurality of playback units.

Yet further objects of the present invention are achieved by an optical disk playback device, comprising first and second playback units to playback data recorded on first and second optical disks which have tracks of plural sectors, with a larger number of sectors per track at the exterior circumference of each optical disk and a smaller number of sectors per track at the interior circumference of each optical disk, and a control unit to perform, in succession from the outer circumference of the first optical disk towards the inner circumference, playback of data from the first optical disk by the first playback unit, and which causes to perform, in succession from the inner circumference towards the outer circumference, playback of data from the second optical disk by the second playback unit, and to combine the data from the first and second optical disks played back by the first and second playback units.

Further objects of the present invention are achieved by an optical disk system, comprising a housing unit to house magazines in which plural optical disks are housed, and a plurality of record/playback units to perform recording or playback with respect to the plural optical disks, and a conveyance unit to convey to the record/playback unit the optical disks housed in the housing unit, wherein the conveyance unit, after the magazines have been housed in the housing unit, conveys to a predetermined record/playback unit among the plurality of record/playback units, the optical disk housed in a predetermined position of the magazine.

Yet even further objects of the present invention are achieved by an optical disk system, comprising a housing unit to house magazines in which a plurality of optical disks are housed, a plurality of record/playback units to perform recording or playback with respect to the plurality of optical disks, and a plurality of conveyance units to respectively convey to the plurality of record/playback units, the respective plurality of optical disks housed in the housing unit, wherein the respective conveyance units, after the magazines have been housed in the housing unit, convey to respective of the record/playback units previously placed in correspondence, the respective optical disks housed in the magazines.

Additional objects and advantages of the invention will be set forth in part in the description which follows and, in part, will be obvious from the description, or may be learned by practice of the invention.

BRIEF DESCRIPTION OF THE DRAWINGS

Other objects, features and characteristics of the present invention will be apparent to one skilled in the art from reading the following detailed description with reference to the appended claims and drawings, all of which form a part of this specification. In the drawings:

DETAILED DESCRIPTION OF THE PREFERRED EMBODIMENTS

First Embodiment

The present invention is described in detail hereinbelow, with reference to the preferred embodiments depicted in the attached drawings.

Figure 1:
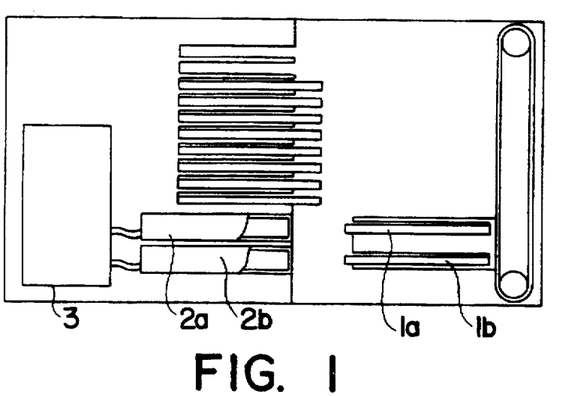
FIG. 1 is a diagram showing the optical disk recording and playback device according to a first preferred embodiment of the present invention.

FIG. 1 is a diagram showing the essentials of an optical disk recording and playback device, for a first preferred embodiment according to the present invention.

In FIG. 1, optical disks 1a and 1b are formatted in the ZCAV method. Each of disks 1b and 1b is divided into thirty zones such that the innermost circumference has thirty sectors per track, and the outermost circumference has fifty-nine sectors per track. Moreover, the amount of data per sector is 1 kbyte (1 KB). Accordingly, in contrast to 30 KB per track recorded on the innermost circumference, 59 KB are recorded on the outermost circumference.

Figure 2:
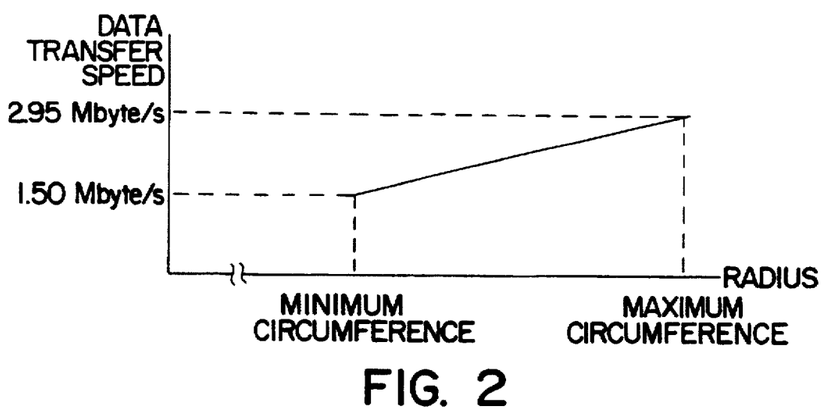
FIG. 2 is a graph showing the relationship of the position (radial) of an optical disk formatted by the ZCAV system, and the data transfer speed thereof.

Moreover, the optical disk drives 2a and 2b are equipped with optical heads (not shown in the drawing) which perform recording and playback of data with respect to the optical disks 1a and 1b. The optical disk drives 2a and 2b rotate the respective optical disks 1a and 1b at 3,000 rpm, and perform recording and playback of data. Namely, the optical disks 1a and 1b rotate 50 times per second. Accordingly, in this embodiment, the data transfer speed of the innermost circumference by one optical disk drive 2a or 2b is 1.5 MB/second, and data transfer speed of the outer circumference is 2.95 MB/second (see FIG. 2).

The operation of this optical disk recording and playback device will next be described while including the function of the control unit 3.

Recording Operation

The control unit 3 divides the data from a host computer (not shown in the drawing) into that for optical disk 1a use and for optical disk 1b use, and sends this divided data to the optical disk drives 2a and 2b. The optical disk drives 2a and 2b, receiving control from the control unit 3, record the data from the control unit 3 on the optical disks 1a and 1b.

At this time, the optical disk drive 2a records data on the optical disk 1a from the outer circumference, which has many sectors per tack, in succession towards the inner circumference. On the other hand, the optical disk drive 2b records data on the optical disk 1b from the inner circumference, which has few sectors per track, in succession towards the outer circumference.

Figure 3:
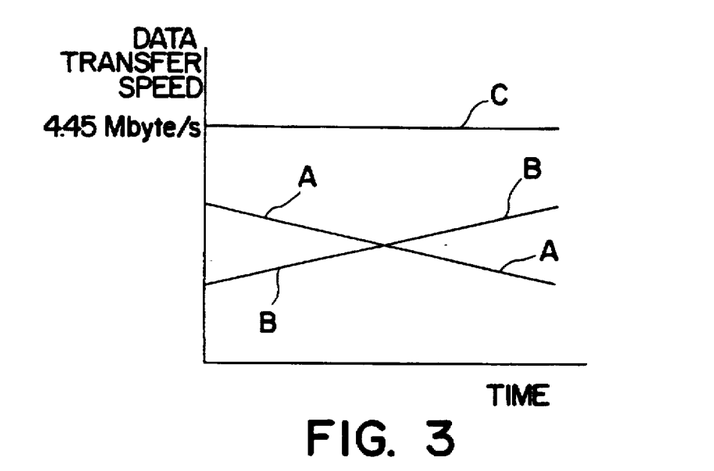
FIG. 3 is a graph explaining the state of affairs in which the data transfer speed becomes normally about constant, in an optical disk recording and playback device according to the first preferred embodiment of the present invention.

FIG. 3, with respect to the two optical disks 1a, 1b, is a diagram showing the change of transfer speed in the case in which recording is simultaneously begun respectively from the outer circumference side or from the inner circumference side. In this case, the transfer speed when recording with respect to the optical disk 1a changes as shown by curve A of FIG. 3. Namely, there is a gradual fall in transfer speed, because the recording region moves, with the passage of time, from the outer circumference side to the inner circumference side. The transfer speed when recording with respect to the optical disk 1b changes as shown by curve B of FIG. 3. Namely, there is a gradual rise in transfer speed, because the recording region moves, with the passage of time, from the inner circumference side to the outer circumference side. The transfer speed when both are combined is shown as curve C in FIG. 3, and is about a constant value.

In the above manner, the total amount of dam recorded per unit time on the optical disks 1a and 1b by the optical disk drives 2a and 2b (namely, the data transfer speed of this optical disk recording and playback device) becomes normally about constant (4.5 MB/second).

In this manner, in this embodiment, by simultaneously recording data on the optical disks 1a and 1b, the on-line capacity becomes large, and also the data transfer speed becomes high. Moreover, due to the total of the data amounts per unit time to the optical disks 1a and 1b by (he optical disk drives 2a and 2b, the data transfer speed is smoothed. Here, because the optical disk drives 2a and 2b are arranged one each for the optical disks 1a and 1b, the constitution may be one head, the optical disks 1a and 1b can be recorded only on the normal single side, and special optical drives are not necessary.

Playback Operation

The optical disk drives 2a and 2b receive control from the control unit 3, and play back data from the optical disks 1a and 1b. The optical disk drive 2a plays back data from the optical disk 1a, in succession from the outer circumference, having many sectors per track, to the inner circumference, having fewer sectors per track. On the other hand, the optical disk drive 2b plays back data from the optical disk 1b, in succession from the inner circumference, having few sectors per track, to the outer circumference, having many sectors per track.

Because of this, the total amount of data played back from the optical disks 1a and 1b by the optical disk drives 2a and 2b (namely, the data transfer speed of this optical disk recording and replay device), becomes normally about constant (4.45 MB/second) (see FIG. 3).

The control unit 3 combines the data played back by the optical disk drives 2a and 2b from the optical disks 1a and 1b, and sends it to the host computer.

In this manner, in this embodiment, by simultaneously playing back data from the optical disks 1a and 1b, the on-line capacity becomes large, and also the data transfer speed becomes high. Moreover, due to the total amount of data per unit time which is played back from the optical disks 1a and 1b by the optical disk drives 2a and 2b being normally about constant, the data transfer speed is smoothed. Here, because the optical disk drives 2a and 2b are arranged one for each of the optical disks 1a and 1b, the constitution may be one head, the optical disks 1a and 1b can be played back only from the normal single side, and special optical drives are not necessary.

Moreover, in this embodiment, there were two optical disk drives, 2a and 2b, but it goes without saying that there is no limitation to two. Namely, the optical disk drives may be two or more, as an even number, not an odd number.

Moreover, in this embodiment, the optical disks 1a and 1b have been described as formatted according to the ZCAV method, but they may be formatted by the MCAV method.

Second Embodiment

An optical disk system is next described according to a second preferred embodiment of the present invention.

Figure 4:
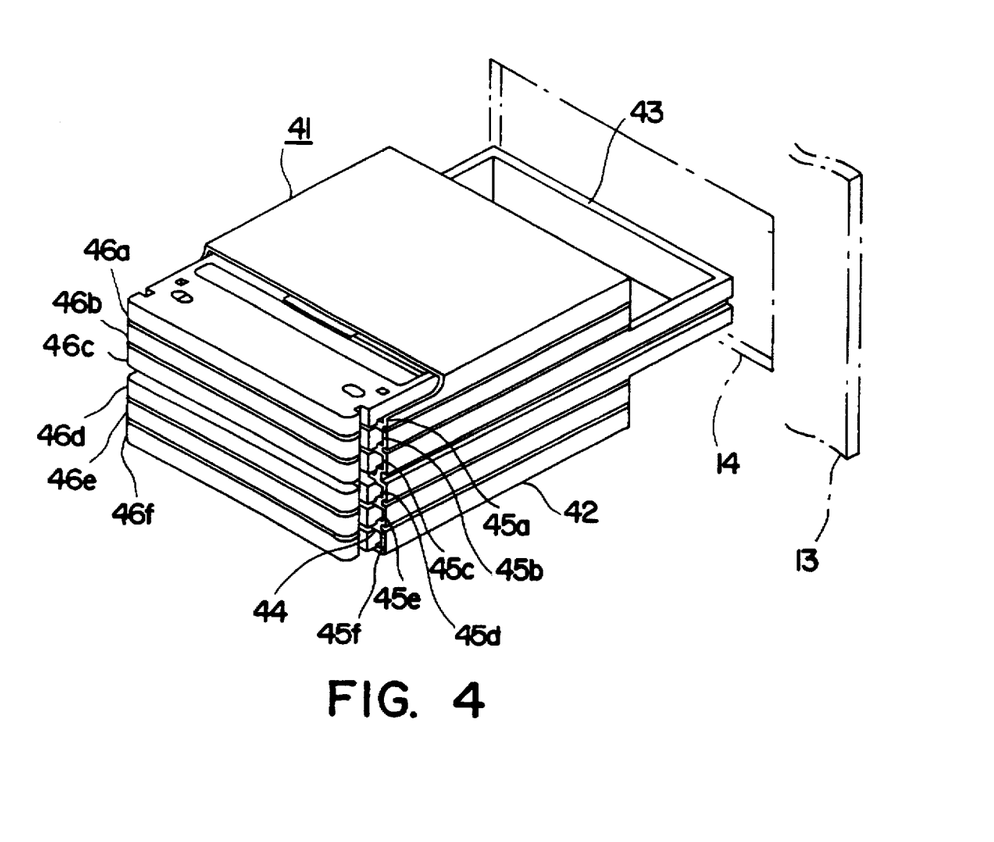
FIG. 4 is an oblique external view showing an example of a magazine used in the optical disk system of second and third preferred embodiments of the present invention.

FIG. 4 is an exterior oblique view of a magazine used in the optical disk recording and playback device of the second embodiment of the present invention. As shown in FIG. 4, it is possible to house six optical disk cartridges in a magazine 41. Housing portions 45a–45f are housed in a case member 42 of the magazine 41. Optical disks are respectively housed in optical disk cartridges 46a–46f. Each optical disk, similar to the first embodiment, is formatted according to the ZCAV method, and is divided into thirty zones, such that the innermost circumference has thirty sectors per tack, and die outermost circumference has fifty-nine sectors per track. Moreover, the data amount per sector becomes 1 KB.

The interior of the case member 42 is partitioned by partition members 44. The optical disk cartridges 46a–46f are accurately housed in the predetermined housing portions 45a–45f which are partitioned by the partition members 44. The magazine has locking mechanisms as required in order to stop the optical disk cartridges from falling out. An operator, holding a handle 43 of the magazine, inserts the magazine into a cabinet as shown in FIG. 5 from an insertion aperture 14 disposed in an outer wall 13 of the cabinet.

Figure 5:
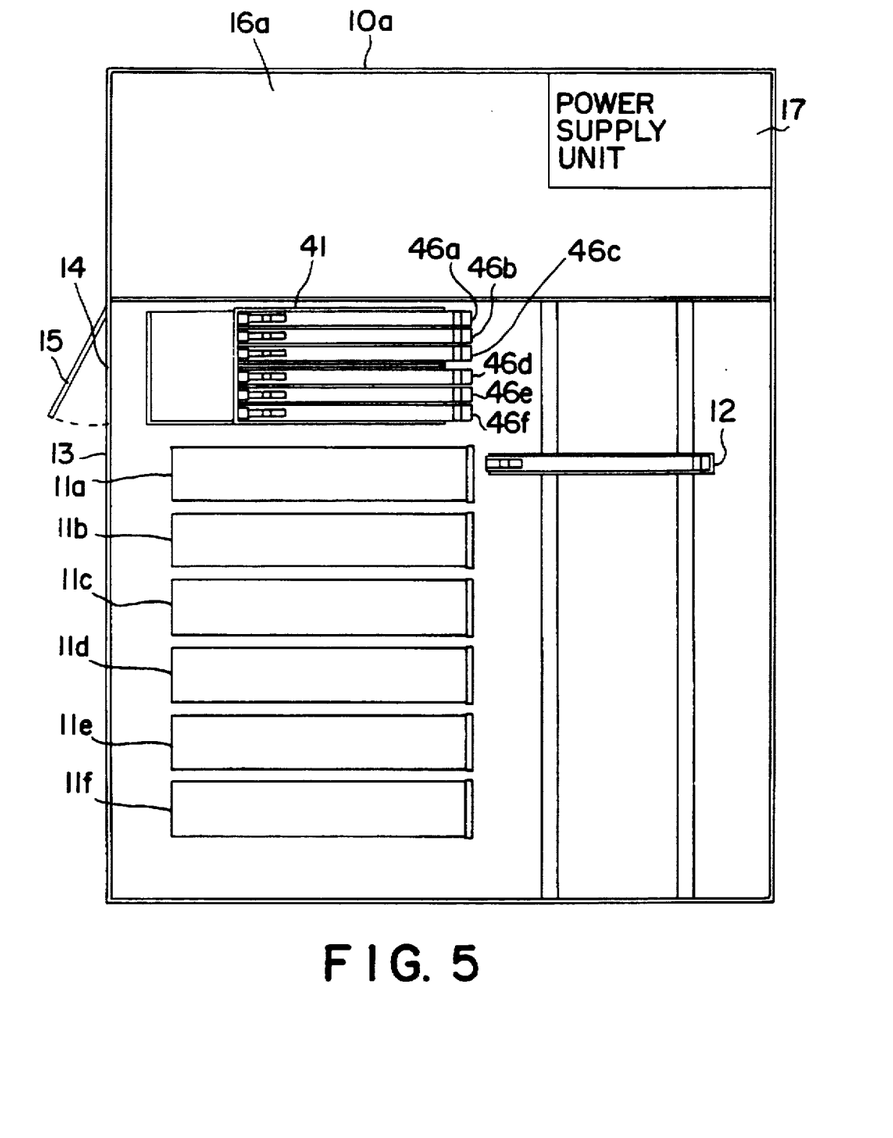
FIG. 5 is a diagram of the optical disk system of the second preferred embodiment according to the present invention, showing the state with the magazine of FIG. 4 inserted.

FIG. 5 is a diagram showing the constitution of an optical disk system according to the second embodiment of the present invention. FIG. 5 shows the inserted state of the magazine 41 in cabinet 10a.

The cabinet 10a has an overall closed configuration with outer wall 13. Insertion aperture 14 is used for die insertion of the magazine 41. The insertion aperture 14 may have a cover unit 15 which covers due open aperture in order to exclude dust. Furthermore, a fan (not shown in the drawing) may be arranged in the cabinet with the object of preventing a rise of temperature. This fan, as a structure which aspirates air from the outside, may be provided with a filter in order to exclude possible dust. Moreover, in the present embodiment, six optical disk drives 11a–11f are arranged in the cabinet. A conveyor unit 12 conveys an optical disk cartridge 46a–46f in the magazine 41 to any of the optical disk drives 11a–11f. A control unit 16a inserts optical disk cartridges, housed in predetermined housing units within the magazine, in specific optical disk drives, controls each optical disk drive, allocates data to be recorded to each optical disk, and moreover, combines the data played back from each disk. A power supply 17 is arranged in order to operate this system, which also has terminals (not shown in the drawing) and the like for connection to a host computer.

When the magazine 41 is inserted into the cabinet 10a, the conveyor unit 12 operates by data from a switch which senses that it has been inserted, or data from the host computer. The conveyor unit 12 extracts one optical disk cartridge which is housed in the magazine 41, conveys the cartridge to a predetermined position, and inserts this optical disk cartridge into an optical disk drive. In this embodiment, the conveyor unit 12, by repeating the conveying operation, mounts in six optical disk drives the six optical disk cartridges, which were housed in the magazine 41. The optical disk drives in which the optical disk cartridges 46a–46f are respectively mounted are determined beforehand. Namely, the optical disk cartridge 46a is conveyed to and mounted in the optical disk drive 11b, the optical disk cartridge 46b to the optical disk drive 11b, and so on, and the optical cartridge 46f to the optical disk drive 11f.

In the above manner, because control of the conveyor unit 12 is always effected in the same manner by control unit 16a, there is no disorder due to erroneous insertion of the disk cartridges, Furthermore, in cases in which the number of optical disk cartridges is smaller than the number of optical disk drives (for example, in FIG. 5, in the case that the optical disk cartridges 46e, 46f are absent), it may be that no optical disk cartridges are inserted in the corresponding optical disk drives (optical disk drives 11e, 11f) The control unit 16a then recognizes the drives (11e, 11f) in which no optical disk cartridges are inserted. The control unit 16a may control the disk drives so as to drive only the drives other than the optical disk drives 11e, 11f.

The operation of this optical disk system is next described.

Recording Operation

The control unit 16a allocates data from the host computer (not shown in the drawing) for use in the optical disk cartridges 46a–46f. The control unit 16a sends this allocated data respectively to the optical disk drives 11b–11f. The optical disk drives 11b–11f receive control from the control unit 16a, and record the data from the control unit 16a on the optical disks of the optical disk cartridges 46a–46f.

At this time, three among the six optical disk drives record data on optical disks in the direction starting from the outer circumference, which has many sectors per track, in succession to the inner circumference. On the other hand, the remaining three optical disk drives record data on optical disks in the direction starting from the inner circumference, which have few sectors per track, in succession to the outer circumference In the case of this embodiment, the optical disk drives 11b–11c record data in the direction from the outer circumference, in succession to the inner circumference, and die optical disk drives 11d–11f If record data in the direction from the inner circumference, in succession to the outer circumference.

In this embodiment, the total amount of data per unit time to each optical disk by the optical disk drives 11b–11f becomes three times that of the first embodiment. The total recording amount per unit time to each optical disk by the optical disk drives 11a–11f (namely, the data transfer speed of the optical disk recording and playback device) becomes normally about constant (13.35 MB/second) (see FIG. 3). In this embodiment, because the number of optical disk drives is three times that of the first of embodiment, the transfer speed also becomes tee times as fast.

In this manner, in this embodiment, by recording data simultaneously on the optical disks in the optical disk cartridges 46a–46f, the on-line capacity becomes large, and also the data transfer speed becomes a high speed. Moreover, the total amount of data recording per unit time to each optical disk by the optical disk drives 11a–11f becomes normally about constant, and the data transfer speed is smoothed.

Here, because one of the optical disk drives 11a–11f has been arranged for a respective one of the optical disk cartridges 46a–46f, the constitution may be one bead, the optical disk drives 11a–11f can record only on the normal single side, and special optical drives are not necessary.

Playback Operation

The optical disk drives 11a–11f receive control from the control unit 16a and play back data from the optical disks of the optical disk cartridges 46a–46f. At this time, the optical disk drives 11a–11c play back data from the respective optical disks in the direction from the outer circumference, which has many sectors per track, in succession towards the inner circumference. On the other hand, the optical disk drives 11d–11f play back data from the respective optical disks in the direction from the inner circumference, which have few sectors per track, in succession towards the outer circumference.

Because of this, the total amount of data played back from the optical disks by the optical disk drives 11a–11f (namely, the data transfer speed of this optical disk recording and replay device), becomes normally about constant (13.35 MB.second).

The control unit 16a combines the data played back by the optical disk drives from the optical disks, and sends it to the host computer.

Third Embodiment

A third preferred embodiment of the present invention will next be described. In this embodiment, similar to the second embodiment, a magazine is used such as shown in FIG. 4.

Figure 6:
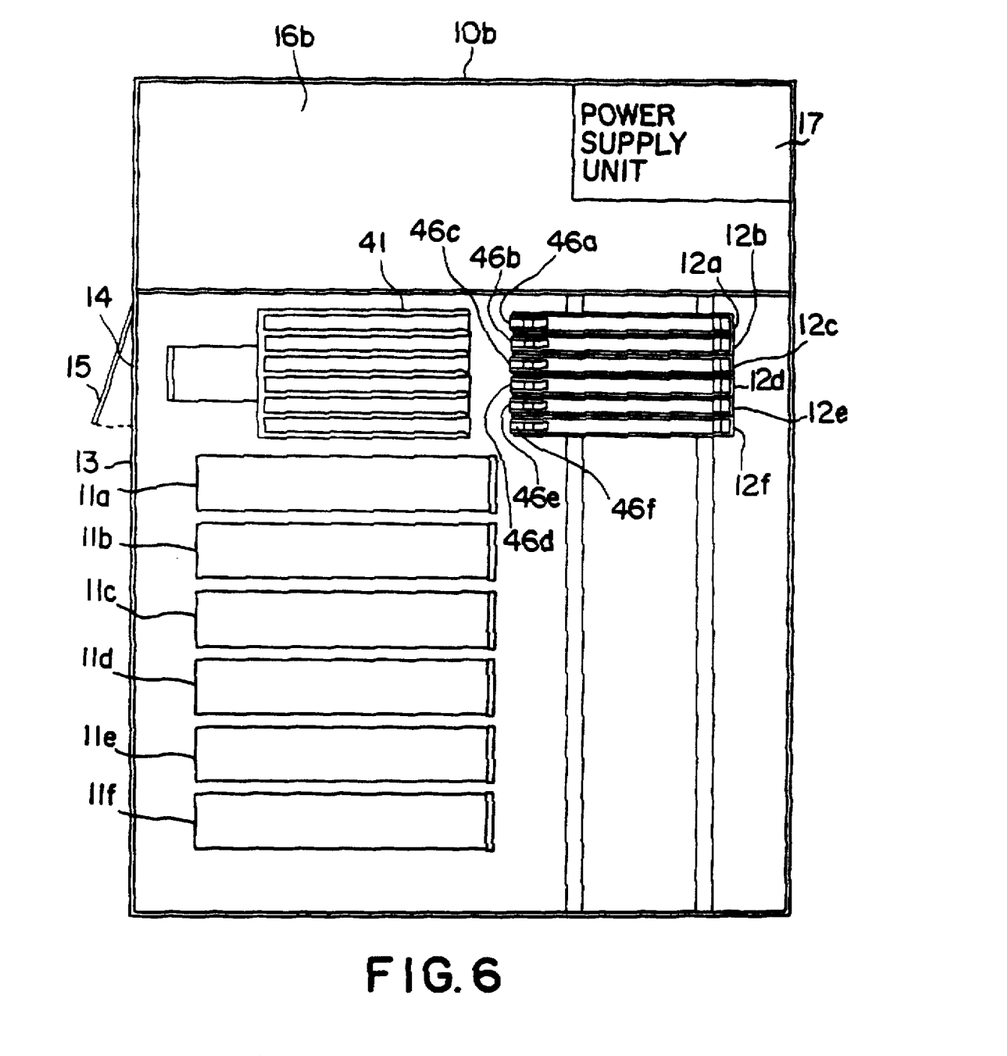
FIG. 6 is a diagram of the optical disk system of the third preferred embodiment according to the present invention, showing the state with the optical disk cartridges carried by the magazine of FIG. 4 chucked in the conveyor units.

FIG. 6 is a diagram showing the constitution of an optical disk system according to the third embodiment of the present invention. FIG. 6 shows the state in which, after a magazine 41 has been inserted into the cabinet 10b, respective conveyor units 12a–12f draw out respective optical disk cartridges which are in the magazine 41.

In this embodiment, six optical disk drives are disposed in cabinet 10b. Plural conveyor units 12a–12f (six in this embodiment) are used in order to convey optical disk cartridges 46a–46f to the optical disk drives.

The control unit 16b inserts optical disk cartridges, housed in predetermined housing units within the magazine, in specific optical disk drives, controls each optical disk drive, allocates data to be recorded to each optical disk, and moreover, combines the data played back from each disk. A power supply 17 is arranged in order to operate his system, which also has terminals (not shown in the drawing) and the like for connection to a host computer.

When the magazine 41 is inserted into the cabinet 10b, the conveyor units 12a–12f operate by data from a switch which senses that it has been inserted, or data from the host computer. The conveyor unit 12a extracts one optical disk cartridge 46a which is housed in the magazine 41, conveys it to a position of the optical disk drive 11a, and inserts this optical disk cartridge 46a into the optical disk drive 11a. Similarly, the conveyor unit 12b inserts the optical disk cartridge 46b in the optical disk drive 11b, and so on, and the conveyor unit 12f inserts the optical disk cartridge 46f in the optical disk drive 11f. The operation of the six conveyor units is performed about simultaneously. Accordingly, in comparison with the second embodiment, the time required to mount the respective optical disk cartridges in the respective optical disk drives can be shortened.

In this embodiment, the respective conveyor units 12a–12f mount the six optical disk cartridges housed in the magazine 41 in the six optical disk drives. The respective optical disk drives in which the optical disk cartridges 46a–46f are mounted are determined beforehand.

Because the control of such conveyor units 12a–12f is always effected in the same manner by the control unit 16b, there is no disorder due to erroneous insertion of the disk cartridges.

Furthermore, in cases in which the number of optical disk cartridges is smaller than the number of optical disk drives (for example, in FIG. 6, in the case that the optical disk cartridges 46e, 46f are absent), it may be that no optical disk cartridges are inserted in the corresponding optical disk drives (optical disk drives 11e, 11f). The control unit 16b then recognizes the drives (11e, 11f) in which no optical disk cartridges are inserted. The control unit 16b may control the disk drives to drive only the drives other than the optical disk drives 11e, 11f.

Figure 7:
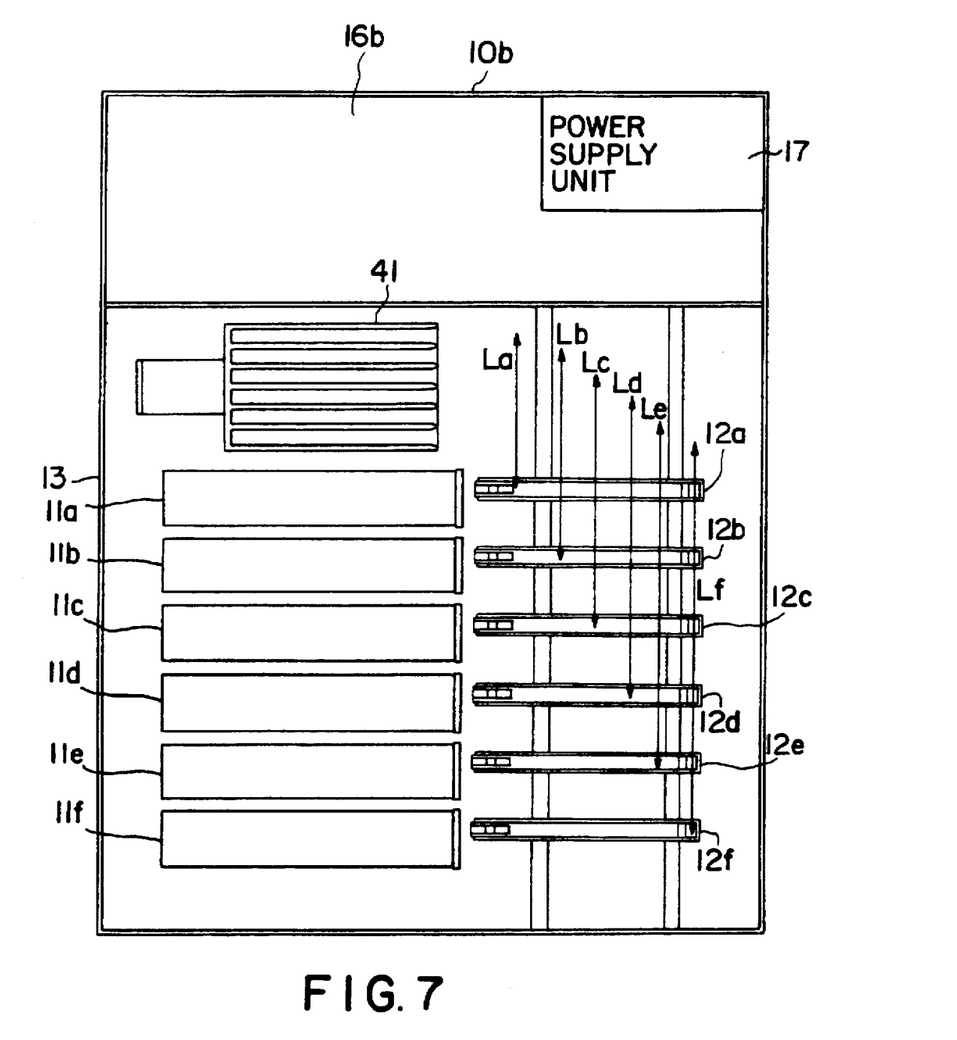
FIG. 7 is a diagram of the optical disk system of the third preferred embodiment according to the present invention, showing the state with the optical disk cartridges conveyed to the position of the optical disk drives.

FIG. 7 shows the state in which the optical disk cartridges 46a–46f have been conveyed to the positions of the respective optical disk drives 11a–11f by the respective conveyor units 12a–12f. It can be seen that the conveyor units 12a–12f move from the positions shown in FIG. 6 to the positions shown in FIG. 7. The movement distance of each conveyor unit at this time becomes successively larger as follows: conveyor unit 12f, conveyor unit 12e, . . . , conveyor unit 12a (in FIG. 7, Lf>Ld>Ld>Lc>Lb>La). Lf, Le, . . . La are constant values. Consequently, for example, by changing the plurality of gear ratios installed in the motor to drive each conveyor unit or by changing the diameters of pulleys, one drive unit (motor) is capable of driving the plurality of conveyor units.

After each optical disk cartridge has been mounted in a respective optical disk drive, recording and/or playback are performed, and as this is similar to the second embodiment, a description is omitted.

In this manner, in the second and third embodiments, by playing back data simultaneously from six optical disks, the on-line capacity becomes larger, and also the data transfer speed becomes a high speed. Moreover, due to the total amount of data per unit time which is played back from the optical disks 11a–11f by the optical disk drives 46a–46f being normally about constant, the data transfer speed is smoothed.

Here, because one optical disk drive 11b–11f is arranged for each optical disk cartridge 46a–46f, the constitution may be one head, the optical disk drives 11a–11f can play back only on the normal single side, and special optical drives are not necessary.

Moreover, in this third embodiment, the optical disks have been described as formatted according to the ZCAV method, but they may be formatted by the MCAV method. Moreover, when performing recording and playback with respect to the optical disk cartridges 46a–46f, die optical disk cartridges 46a–46f have to be inserted all in the same sequence into the magazine 41.

Furthermore, in the case that the optical disk cartridges 46a–46f use optical disks which can record and play back on both sides, inserting each disk cartridge turned upside down, the disks can be used for the recording and playback of a separate data sequence in the second and third embodiments.

In accordance with the first through third embodiments as described above, the transfer rate is increased by causing the parallel processing of plural disk drives. However, when one optical disk drive breaks down, by changing over to other optical disk drives, a reliable method also may be maintained.

In accordance with the first through third embodiments as described hereinabove, without using special optical disk drives, the on-line capacity can be made larger, the data transfer speed can be increased, and the data transfer speed can be smoothed. Moreover, in accordance with the first through the embodiments, because a plurality of optical disk cartridges are invariably inserted in predetermined optical disk drives, there is no disorder of the data due to erroneous insertion, and a highly reliable memory system can be constructed.

In accordance with the first through third embodiments, by having a plurality of conveyor units, the time for loading and unloading also can be shortened.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical disk recording device, comprising:
a plurality of recording units to record data on at least two optical disks, respectively; and
a control unit to divide data to be recorded, for use with said optical disks, to send the divided data to the plurality of recording units, and to control a recorded amount of data per unit time onto said optical disks by the plurality of recording units being substantially constant.

2. An optical disk recording device, comprising:
first and second recording units to record data on first and second optical disks, each disk having tracks of plural sectors with a larger number of sectors per track at an outer radial position of each optical disk; and
a control unit to divide data to be recorded for use on the first and second optical disks, to send the divided data to the first and second recording units, to cause performance by the first recording unit of recording of data to the first optical disk, in a direction in succession from the outer radial position towards an inner radial position, and to cause performance by the second recording unit of recording of data to the second optical disk, in succession from the inner radial position towards the outer radial position.

3. An optical disk playback device, comprising:
a plurality of playback units which playback data recorded in at least two optical disks; and
a control unit to control, and to keep substantially fixed, total playback amount per unit time of the data from the optical disks, and in addition to combine data from the optical disks played back by the plurality of playback units.

4. An optical disk playback device, comprising:
first and second playback units to playback data recorded on first and second optical disks which have tracks of plural sectors, with a larger number of sectors per track at an outer radial position of each optical disk; and a control unit to perform, in succession from the outer radial position of the first optical disk towards an inner radial position, playback of data from the first optical disk by the first playback unit, and which causes to perform, in succession from the inner radial position towards the outer radial position, playback of data from the second optical disk by the second playback unit, and to combine the data from the first and second optical disks played back by the first and second playback units.

5. An optical disk system, comprising:

a housing unit to house magazines in which plural optical disks are housed;

a plurality of playback units to perform playback with respect to the plural optical disks;

a conveyance unit to convey to the playback units the optical disks housed in the housing unit;

a control unit to combine data from the optical disks played back by the plurality of playback units;

wherein the conveyance unit, after the magazines have been housed in the housing unit, conveys to a predetermined playback unit among the plurality of playback units, the optical disk housed in a predetermined position of the magazine.

6. An optical disk system as claimed in claim 5, wherein a number of the optical disks housed in the magazine is the same as, or less than, a number of the playback units.

7. An optical disk system, comprising:

a housing unit to house magazines in which plural optical disks are housed;

a plurality of playback units to perform playback with respect to the plural optical disks;

a plurality of conveyance units to respectively convey to the plurality of playback units, the respective plurality of optical disks housed in the housing unit;

a control unit to combine data from the optical disks played back by the plurality of the playback units;

wherein the respective conveyance units, after the magazines have been housed in the housing unit, convey to the respective playback units positioned in a predetermined manner in correspondence, the respective optical disks housed in the magazines.

8. An optical disk system as claimed in claim 7, wherein a number of the optical disks housed in the magazine is the same as, or less than, a number of the playback units.

9. An optical disk system, comprising:

a housing unit to house magazines in which plural optical disks are housed;

a plurality of recording units to perform recording with respect to the plural optical disks;

a conveyance unit to convey to the recording units the optical disks housed in the housing unit;

a control unit to divide data to be recorded, for use with the optical disks, to send the divided data to the plurality of recording units;

wherein the conveyance unit, after the magazines have been housed in the housing unit, conveys to a predetermined recording unit among the plurality of recording units, the optical disk housed in a predetermined position of the magazine.

10. An optical disk system as claimed in claim 9, wherein a number of the optical disks housed in the magazine is the same as, or less than, a number of the recording units.

11. An optical disk system, comprising:

a housing unit to house magazines in which plural optical disks are housed;

a plurality of recording units to perform recording with respect to the plural optical disks;

a plurality of conveyance units to respectively convey to the plurality of recording units, the respective plurality of optical disks housed in the housing unit;

a control unit to divide data to be recorded, for use with the optical disks, to send the divided data to the plurality of recording units;

wherein the respective conveyance units, after the magazines have been housed in the housing unit, convey to respective ones of the recording units positioned in a predetermined manner in correspondence, the respective optical disks housed in the magazines.

12. An optical disk system as claimed in claim 11, wherein a number of the optical disks housed in the magazine is the same as, or less than, a number of the recording units.

* * * * *